United States Patent

Kruckenberg et al.

[11] 3,993,619
[45] Nov. 23, 1976

[54] PROCESS FOR DYEING POLYURETHANE RESINS

[75] Inventors: Winfried Kruckenberg; Konrad Nonn, both of Leverkusen; Georg Pape, Opladen; Michael Kressner, Odenthal, all of Germany

[73] Assignee: Bayer Aktiengesellschaft, Leverkusen, Germany

[22] Filed: May 22, 1975

[21] Appl. No.: 580,035

[30] Foreign Application Priority Data

May 29, 1974 Germany.............................. 2426172

[52] U.S. Cl...................... 260/37 N; 260/77.5 AM; 260/207.5
[51] Int. Cl.² ...................... C08G 18/32; C08K 5/23
[58] Field of Search ........ 260/205, 206, 207, 207.1, 260/37 N, 199, 207.5, 77.5 AM

[56] References Cited
UNITED STATES PATENTS

| | | | |
|---|---|---|---|
| 2,632,004 | 3/1953 | Minsk et al. .................. | 260/207.5 X |
| 2,888,450 | 5/1959 | Kruckenburg .............. | 260/207.5 X |
| 3,137,671 | 6/1964 | Bosshard et al. .................... | 260/858 |
| 3,627,748 | 12/1971 | Roueche et al. .............. | 260/37 N X |
| 3,642,767 | 2/1972 | Hahn et al. .................. | 260/37 N X |
| 3,880,797 | 4/1975 | Maeda et al. ...................... | 260/37 N |

FOREIGN PATENTS OR APPLICATIONS 1,114,317   9/1961   Germany

*Primary Examiner*—Donald E. Czaja
*Assistant Examiner*—S. M. Person
*Attorney, Agent, or Firm*—Plumley and Tyner

[57] ABSTRACT

Dyestuffs of the formula

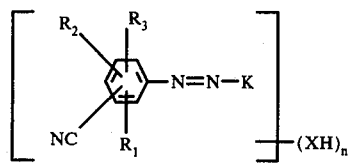

wherein:
$R_1$ denotes cyano, halogen, alkoxy, alkylsulphonyl, arylsulphonyl, optionally mono or disubstituted carbamoyl or optionally mono- or disubstituted sulphamoyl,
$R_2$ denotes hydrogen, cyano carboxyl, halogen, alkoxy, alkyl, alkylsulphonyl or arylsulphonyl,
$R_3$ denotes hydrogen cyano, halogen or alkyl,
K denotes the residue of a coupling component of the arylamine series,
X denotes O, NH or N—$C_1$–$C_4$-alkyl and
n denotes an integer of from 1 to 4, the XH groups being attached to one or more substituents $R_1$, $R_2$, $R_3$, or to a substituent of the coupling component are added to the reaction mixture or to one of the components are suitable for the dyeing of polyurethane resins by incorporating into the resins by the formation of covalent bonds.

5 Claims, No Drawings

PROCESS FOR DYEING POLYURETHANE RESINS

This invention relates to a process for dyeing polyurethane resins with dyes which may be incorporated into the resin by the formation of covalent bonds, characterised in that dyes of the formula:

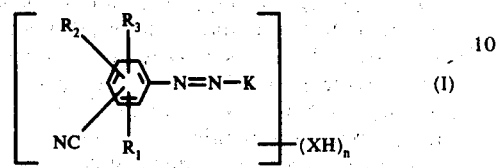

wherein:
$R_1$ denotes cyano, halogen, alkoxy, alkylsulphonyl, arylsulphonyl, carbamoyl which is optionally mono- or disubstituted, sulphamoyl which is optionally mono- or disubstituted or alkoxycarbonyl;
$R_2$ denotes hydrogen, cyano, carboxyl, halogen, alkoxy, alkyl, alkylsulphonyl or arylsulphonyl;
$R_3$ denotes hydrogen, cyano, halogen or alkyl;
K denotes the residue of a coupling component of the arylamine series;
X denotes O, NH or N—$C_1$—$C_4$ alkyl; and
$n$ denotes an integer of from 1 and 4
and in which the XH groups are attached to one or more of the substituents $R_1$, $R_2$, $R_3$ or to a substituent of the coupling component are added to the reaction mixture or to one of the components before or during the polyaddition reaction.

In the above formula, halogen atoms $R_1$, $R_2$ and $R_3$ are in particular chlorine and bromine.

Suitable alkoxy groups $R_1$ and $R_2$ are, for example, those with 1 to 4 C atoms optionally substituted by hydroxyl.

Suitable alkylsulphonyl groups $R_1$ and $R_2$ are e.g. those with 1 to 4 C atoms. Suitable arylsulphonyl groups $R_1$ and $R_2$ are, for example phenylsulphonyl optionally substituted by chlorine, bromine, methyl, methoxy or cyano.

Suitable substituents of the carbamoyl and sulphamoyl groups $R_1$ and e.g. alkyl groups with 1 to 4 C atoms optionally substituted by hydroxyl groups; phenyl groups optionally substituted by methyl, methoxy, chlorine or bromine: benzyl or phenylethyl.

Suitable alkyl groups $R_2$ and $R_3$ are in particular those with 1 to 4 C atoms.

Suitable coupling components of the arylamine series are e.g. those of the formula:

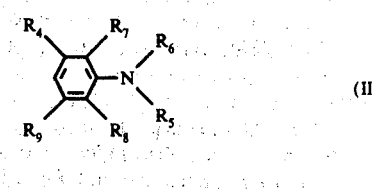

wherein:
$R_4$ denotes hydrogen, chlorine, bromine, $C_1$–$C_4$ alkyl, $C_1$–$C_4$ alkoxy, $C_2$–$C_5$ alkylcarbonylamino in which the alkyl group may be substituted by OH or by hydroxy-$C_1$–$C_4$-alkylaminocarbonyl; or $R_4$ may denote benzoylamino;
$R_5$ denotes hydrogen, $C_1$–$C_4$ alkyl which may be substituted by OH, $NH_2$, $NHCH_3$, CN, hydroxy-$C_1$–$C_4$-alkoxy, hydroxy-$C_1$–$C_4$-alkylaminocarbonyloxy, $C_1$–$C_4$-alkoxy or carboxy; or it may denote phenyl, benzyl or phenethyl;
$R_6$ denotes $C_1$–$C_4$ alkyl which may be substituted by OH, $NH_2$, $NHCH_3$, CN, $C_1$–$C_4$ alkoxy or COOH, or it may denote benzyl or phenethyl or together with $R_7$ it may denote the remaining members of a 5- or 6-membered non-aromatic ring;
$R_7$ denotes hydrogen, $C_1$–$C_4$ alkyl, $C_1$–$C_4$-alkoxy, chlorine or bromine or, together with $R_6$, the remaining members of a 5-membered or 6-membered non-aromatic ring;
$R_8$ denotes hydrogen, $C_1$–$C_4$ alkyl, $C_1C_4$ alkoxy or $C_2$–$C_5$ alkylcarbonylamino or, together with $R_9$ the remaining members of a condensed benzene or phenol ring in which the OH group is in the peri-position to the azo group; and
$R_9$ denotes hydrogen, or $C_2$–$C_5$ alkylcarbonylamino or, together with $R_8$, the remaining members of a condensed benzene or phenol ring in which the OH group is in the peri-position to the azo group.

Preferred dyes correspond to the formula:

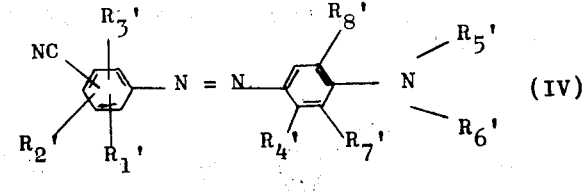

wherein:
$R_140$ denotes cyano, chlorine, methoxy, a sulphonamide or carbonamide optionally monosubstituted or disubstituted by $C_1$–$C_4$-alkyl or by hydroxy-$C_1$–$C_4$-alkyl, or it may denote methoxycarbonyl;
$R_2'$ denotes hydrogen, cyano, chlorine, carboxy or methyl;
$R_3'$ denotes hydrogen, chlorine or methyl;
$R_4'$ denotes hydrogen, methyl, methoxy, acetylamino or hydroxyacetylamino;
$R_5'$ denotes hydrogen or an alkyl group with 1 to 4 C atoms optionally substituted by hydroxyl, $C_1$–$C_4$ hydroxyalkoxy, cyano, amino, methylamino, carboxy or N,N-bis-(2-hydroxyethyl)-aminocarbonyloxy;
$R_6'$ denotes a $C_1$–$C_4$ alkyl group optionally substituted by hydroxyl or cyano, or together with $R_7'$ it may denote propylene, hydroxypropylene, isopropylene or ethylene;
$R_7'$ denotes hydrogen, or together with $R_6'$ it denotes propylene, hydroxypropylene, isopropylene or ethylene; and
$R_8'$ denotes hydrogen or methoxy;
and the formula:

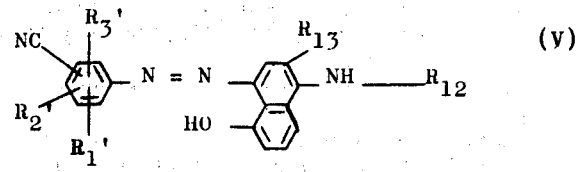

wherein:
$R_1'$, $R_2'$ and $R_3'$ have the meaning indicated above;
$R_{12}$ denotes optionally hydroxysubstituted $C_1$–$C_4$alkyl, phenyl, benzyl or phenethyl, or together with $R_{13}$ it may denote an optionally hydroxyl substituted $CH_2$—$CH_2$ or $CH_2$—$CH_2$—$CH_2$; and
$R_{13}$ denotes hydrogen or together with $R_{12}$ it may denote ethylene or propylene optionally substituted by hydroxyl.

Dyes of the following formula are particularly preferred:

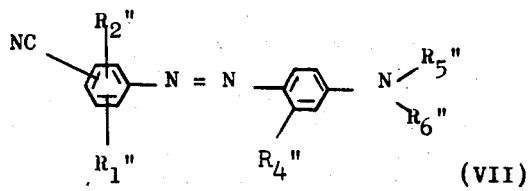

(VII)

wherein:
$R_1''$ denotes chlorine or cyano;
$R_2''$ denotes hydrogen or chlorine;
$R_4''$ denotes hydrogen, methyl or acetylamino; and
$R_5''$ and $R_6''$ denote 2-hydroxyethyl.

The dyes are obtained by coupling diazotised amines of the formula:

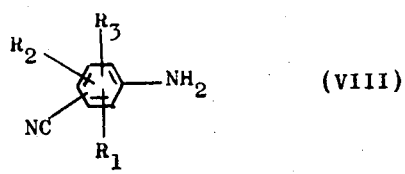

(VIII)

with coupling components of the formula:

KH                                                              (IX)

wherein: $R_1$, $R_2$, $R_3$ and K have the meaning indicated above, by conventional methods.

The following are examples of suitable diezo components (VIII):

2-Cyano-5-chloroaniline, 3,4-dicyanoaniline, 2,5-dichloro-4-cyanoaniline, 3-chloro-4-cyanoaniline, 2,4-dicyanoaniline, 2-cyano-4-chloro-6-bis-(2-hydroxyethyl)-aminocarbonylaniline, 2,4-dicyano-6-chloroaniline, 2,5-dichloro-4-cyanoaniline, 2,6-dicyano-4-methoxycarbonylaniline, 2,4-dicyano-3,5-dimethylaniline, 2,5-dicyanoaniline, 2,6-dicyano-4-methylaniline, 2,5-dicyano-4,6-dichloroaniline, 2,6-dicyano-4-chloroaniline, 2,4,6-tricyanoaniline, 2,5-dicyano-4-bromoaniline, 2,3,4-trichloro-6-cyanoaniline, 2-carboxy-4-cyanoaniline, 2,4-dicyano-6-methylaniline, 2-methoxy-4-cyanoaniline, 2,6-dichloro-4-cyanoaniline, 2,3,6-trichloro-4-cyanoaniline, 2-cyano-4-(2-hydroxyethyl)-aniline, 2-cyano-4-methylsulphonylaniline, 2-cyano-4-phenyl-sulphonylaniline, 2,5-dicyano-4-dimethylaminosulphonylaniline, 2,6-dicyano-4-(N,N-bis-(2-hydroxyethyl)-aminosulphonyl)-aminosulphonyl)-aniline, 2-cyano-4-chloro-6-(N,N:bis-(2-hydroxyethyl)-aminosulphonyl)-aniline.

The following are examples of suitable coupling components (IX):

N,N-Bis-(2-hydroxyethyl)-aniline, N,N-bis-(2-hydroxyethyl)-3-methylaniline, N,N-bis-(2-hydroxyethyl)-3-acetylaminoaniline, N,N-bis-(2-(2-hydroxyethoxy)-ethyl)-aniline, N,N-bis-(2-hydroxyethyl)-2,5-dimethoxyaniline, N,N-bis-(2-hydroxyethyl)-2-methoxy-5-methylaniline, N-ethyl-N-(2-hydroxyethyl)-3-hydroxyacetylaminoaniline, N,N-bis(2-hydroxybutyl)-aniline, N,N-bis-(2-hydroxypropyl)-aniline, N-ethyl-N-(N'-bis-(2-hydroxyethyl)-aminocarbonyl hydroxyethyl)-aniline, N-ethyl-N-(2-hydroxyethyl)-aniline, N-(2-hydroxyethyl)-2-methylindoline, N-(2-hydroxyethyl)-1,2,3,4-tetrahydroquinoline, N-(2,3-dihydroxypropyl)-1,2,3,4-tetrahydroquinoline, N-ethyl-N-(2-aminoethyl)-aniline, N-ethyl-N-(2-methylaminoethyl)-aniline, N,N-bis-(2-aminoethyl)-aniline, N,N-diethyl-2-carboxyaniline, N-(2-hydroxyethyl)-N-(2-carboxyethyl)-aniline, N-ethyl-N-(2-carboxyethyl)-3-acetylaminoaniline, 1-(N,N-bis-(2-hydroxyethyl)-amino)-naphthalene, N-ethyl-N-(2,3-dihydroxypropyl)-aniline, 5-benzylamino-1-naphthol, 5-anilino-1-naphthol, 5-(2-hydroxyethyl)-amine-1-naphthol, 5-(2-hydroxybutyl)-amino-1-naphthol, 5-(2-hydroxypropyl)-amino-1-naphthol, 5-(1,3-dihydroxy-2-methylpropyl-(2))-amino-1-naphthol, 5-(1,3-dihydroxy-2-hydroxymethylpropyl-(2))-amino-1-naphthol, 3,7-dihydroxy-1,2,3,4-tetrahydrobenzo[h]-quinoline, N,N-bis-(4-hydroxybutyl)-aniline, N,N-bis-(3-hydroxypropyl)-aniline, N,N-bis-(2,3-dihydroxypropyl-m-toluidine, N-(2-hydroxyethyl)-aniline, N,N-diethyl-3-hydroxyacetylamino-aniline, N,N-bis-(2-hydroxy)-2-methoxy-5-acetylamino-aniline, N,N-diethylaniline, N-ethyl-N-(β-cyanoethyl)-m-toluidine, N-ethyl-N-benzylaniline, N-methyl-diphenylamine, N,N-bis(β-methoxyethyl)-m-toluidine.

The polyurethane resins which are to be dyed by the process according to the invention may be used for various purposes, for example as pressed articles, sheets, fibres, foams, lacquers and coating materials.

The polyurethanes may contain other functional groups in the marcromolecule, such as amide, urea or carbodiimide groups, in addition to the characteristic urethane groups.

To carry out the process according to the invention, the dye of formula (1) is added in some suitable form to the polyol or polyisocyanate component or to the reaction mixture either before or during polyurethane formation. The subsequent reaction is carried out in the usual manner, i.e. in the same way as for polyurethane resins which are not dyed. Details about this may be found in the relevant literature.

The dyes may be added solvent-free as powders or preferably in the form of solutions or dispersions in a suitable solvent or dispersing medium.

For the production of foams, it has been found suitable to use solutions or dispersions in high boiling organic liquids, for example in aliphatic or aromatic esters of phosphoric acid, phosphonic acid, phthalic acid or adipic acid, such as diphenylisopropyl, diphenylcresyl, diphenyloctyl, trichloroethyl and tributylphosphate, dioctyl, butylbenzyl and dibutylphthalate and dioctyl and octylbenzyl adipate, lactones such as butyrolactone, alcohols, particularly liquid polyalcohol, for example octaethylene glycol, and condensation products of adipic acid and butane-1,3-diol or propylene-1,2-glycol, ketones or ethers with boiling points above 180° C and vapour pressures below 1 mbar at 20° C. Polyurethane foams coloured in this way may be soft, semi-hard or hard foams, or the so-called polyurethane integral foams.

Polyurethane thermoplasts which have been coloured with the dyes according to the invention and which are used for producing shaped products by injecting moulding, extrusion or calendering are obtained by adding the dye dissolved or dispersed in a polyol or in a diol which serves as a chain lengthening agent to the reaction mixture or to one of the components, preferably to the polyol component.

The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols.

Chain lengthening diols are e.g. ethylene glycol, diethylene glycol, butanediol, hexanediol, octanediol and hydroquinone-β-dihydroxyethylether.

If monoalcohols or monoamines are also used for producing the thermoplastic polyurethane, then the dye may also be dissolved or dispersed in these reactants. Suitable monoalcohols are e.g. hexanol, octanol, nonyl alcohol or isooctanol.

The dyes (1) are also suitable for colouring polyurethane systems used for textile coating. The coloured polyurethanes may be used as powders, solutions or dispersions. Details about the chemistry and technical applications of these substances may be found in the technical literature, e.g. Melliand Textilberichte 53, 1272–1277 (1972); 52, 1094 –1099 (1971); 51, 1313–1317 (1970).

If the dye is to be used for colouring coating powders, it is most suitably dispersed in the polyol component before a prepolymer is prepared by reaction with a diisocyanate, which prepolymer is reacted with a diamine in the last stage, this reaction being accompanied by chain lengthening and resulting in a coloured, pourable thermoplastic polyurethane powder.

If the dye is to be used in solutions of one component polyurethane coating compounds and aqueous dispersions, it is most simply added to the polyol component used for producing the polyurethane, and it then becomes incorporated into the polyurethane molecule when this is reacted with the diisocyanate. In two component polyurethane textile coating compounds, the dye may either be incorporated into the polyurethane which can be cross-linked, or it may be added to the cross-linkable polyurethane as a paste dispersed in a suitable medium, for example in a solution of a polyester polyurethane in methyl ethyl glycol/toluene, the dye being in this case incorporated into the molecule in the last reaction stage of the reaction with a diisocyanate.

Polyurethane elastomers from which elastomer threads can be produced by the usual processes may be dyed with dyes of formula (1).

For this purpose the dye is finely divided in the dihydroxy component before this is reacted with a diisocyanate to form an NCO-containing prepolymer in which the dye is chemically incorporated.

A polyurethane elastomer solution is obtained from the prepolymer in solution by reaction with a diamine which serves as a chain lengthening agent. This elastomer solution may be made into filaments by dry or wet spinning processes or it may be made into films by spread coating it on glass plates and drying it, for example for 30 minutes at 70° C and 45 minutes at 100° C.

Details about the preparation of polyurethane elastomer solutions may be found, for example, in German Offenlegungsschrift No. 1,962,602.

Dyeing polyurethane lacquers with dyes of formula (1) is suitably carried out by dissolving the dye in the solution which contains the polyisocyanate and polyol component. The dyed lacquer is then applied to the surface which is to be lacquered, and then stoved, for example for 30 minutes at 180° C. The dye is incorporated in a very stable form so that it can be overlacquered without bleeding.

For whatever purpose they are used, the dyes are suitably used in concentrations of 0.005 to 1.0%, preferably 0.05 to 0.5%, based on the polyol component.

Yellow to red or blue polyurethane resins suitable for various fields of application and distinguished by very high fastness levels are obtained by the process according to the invention.

Structurally similar dyes which have already been proposed for dyeing polyurethane resins have the disadvantage of being phototropic, i.e. they undergo a reversible change in colour tone under the influence of light. It is surprisingly found that this disadvantage does not occur with the dyes according to the invention.

EXAMPLE 1 a. A mixture consisting of 10.0% of dye of the formula

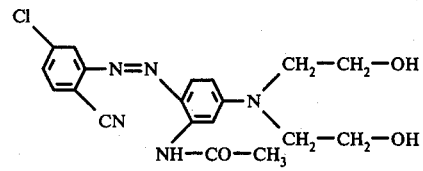

13.5% of butylbenzylphthalate and 76.5% of a condensation product of adipic acid and propylene-1,2-glycol having a hydroxyl number of 112 – 115 and an acid number of 0.31 is homogenised by stirring and then ground up in a continuously operating commercial stirrer mill containing as grinding elements glass balls 0.3 to 0.4 mm in diameter and having a shaft with circular discs which rotates at a speed of 100 revs/min. Grinding is continued until the dye has been reduced to a particle size of less than 1 to 2 μ

To produce a red polyurethane foam 0.5% by weight of the dye dispersion is supplied from a separate feed pump to the mixing chamber of the foaming apparatus according to German Pat. No. Spec. 901,471. After vigorous mixing of the reactants (the formulations for a polyether and a polyester foam are described in the following paragraphs) a uniformly deep red foam with a uniform pore structure is obtained, which is distinguished by very high light fastness and fastness to bleeding.

b. A polyether foam is produced from 100 g of a conventional trifunctional polyether prepared from trimethylolpropane, propylene oxide and ethylene oxide (OH number 35), 4 g of water, 0.8 g of a polysiloxane-polyalkylene block copolymer as stabilizer, 0.12 g of triethylenediamine as catalyst, 0.16 g of tin octoate and tolylene diisocyanate in a quantity which is stoichiometric with respect to the quantity of polyether and water used.

c. A polyester foam is produced from the following components: 100 g of a polyester prepared from adipic acid and diethyleneglycol (OH number 50), 4 g of water, 1.4 g of N-methylmorpholine as catalyst, 1.5 g of an emulsifier which consists of an ethylene oxide adduct of a mixture of higher alcohols and which have an average molecular weight of 1100 and an OH number of 52, 3.8 g of a sulphonated castor oil, 0.2 g of paraffin oil and tolylene diisocyanate in a quantity which is stoichiometric with respect to the quantity of polyester and water used.

EXAMPLE 2

Dye dispersions are preapred as in Example 1, but the adduct of adipic acid and propylene glycol is replaced by a polydipropylene glycol adipate having an OH number of 110–111 and an acid number of 0.2 or by a condensation product of adipic acid and butane-1,3-diol having an OH number of 114 and an acid number of 0.36.

Deep red ether or ester foams with very fast colours are also obtained from these dye dispersions.

EXAMPLE 3 a. A red dye paste of 20 g of the dye mentioned in Example 1 and 80 g of a polyether which has been obtained by reacting 1 mol of trimethylene propane with 3 mols of ethylene oxide and which has an OH number of 550 is prepared as follows:

In a dispersion kneader, the dye is kneaded with such a quantity of the above mentioned polyether that a tough kneadable mass is obtained (about 0.4 g of polyether are used for 1 g of dye). After a kneading time of 10 minutes, the mass is very slowly diluted with the remaining quantity of polyether while continuously kneaded. A dye paste is obtained which is used for dyeing hard polyurethane integral foam.

b. 100 g of a polyol mixture having an OH number of 495 and a viscosity of 11150 cP at 25° C consisting of 80 g of a polyether having an OH number of 550 which has been obtained by the addition of ethylene oxide to trimethylolpropane and 20 g of a polyester having an OH number of 370 which has been obtained by reacting 1 mol of adipic acid, 2.6 mol of phthalic acid anhydride, 1.3 mol of oleic acid and 6.9 mol of trimethylolpropane are mixed with 1 g of a polysiloxanepolyslkylene oxide block copolymer as foam stabiliser, 0.5 g of tetramethylguanidine as catalysts, 5 g of monofluorotrichloromethane as blowing agent and 5 g of the dye preparation described above. The mixture is fed into a two-component feeding and mixing apparatus in which it is used for preparing the foaming reaction mixture by vigorously mixing it with 155 g of a polyisocyanate which has been obtained by phosgenating aniline-formaldehyde condensates followed by reaction with a diol having an OH number of 450 and which has a viscosity of 130 cP at 25° C and an NCO content of 28% by weight. The reaction mixture is then immediately introduced into a metal mould heated to 60° C. After 7 minutes in the mould, the red coloured hard polyurethane integral foam which has a gross density of 0.6 g/cm$^3$ can be removed from the mould. The mechanical properties (elastic modulus, flexural strength, elongation at break impact strength dimensional stability in the heat etc.) of the dye moulded product are not reduced compared with those of a product which has not been dyed.

EXAMPLE 4

100 g of a polyester of ethane diol, butane diol and adipic acid which has a molecular weight of 2000 (OH number 56) are stirred up with a paste of 0.1 g of the dye described in Example 1 22 g of butane-1,4-diol and 1,2-g of n-octanol (0.037 mol based on butane-1,4-diol). 0.3 g of stearylamide and 1 g of stabiliser (2,6,2',-6'-tetraisopropyl - diphenylcarbodiimide) are also added and the mixture is heated to 90° C with stirring and mixed with equivalent quantities of 4,4'-diphenylmethane diisocyanate (74.6 g based on the total OH content) at 60° C with vigorous stirring. The mixture is then poured onto a metal sheet and when solidified it is granulated and extruded.

A red coloured shaped polyurethane elastomer product is obtained.

EXAMPLE 5 a. 482.5 g of hexanediol polycarbonate having a molecular weight of 1050 are dehydrated at 125° C and 14 Torr. 3.4 g of the dye described in Example 1 are added at 120° C and the mixture is stirred for 10 minutes and left to cool to 100° C. 76.0 g of 1,6-diisocyanatohexane are then added and the temperature is maintained at 100° C for 1 hour.

The reaction mixture is then cooled to 60° C. 4.0 g of N-methyl-diethanolamine and 169.5 g of acetone are run in and the temperature is maintained at 60° C for 3 hours.

After further cooling to 50° C 3.1 ml of diemthylsulphate on 400 g of acetone are added and the mixture is stirred for 20 minutes.

737 g of a 50% prepolymer solution in acetone with an NCO content 1.1% are obtained. 743 g of prepolymer are mixed with 165 g of normal prepylene diamine solution in water and 578 g of distilled water at 45° C with vigorous stirring.

The acetone is distilled off and the residue is washed with water, passed through a 0.5 m sieve suction filtered and dried.

A red, easily pourable thermoplastic polyurethane powder with a melting point of 135° C is obtained. It is used for textile coatings.

b. The powder described above (spherical particles with an average diameter of 43 μ) is spread coated in a thickness of 100 g/m$^2$ on a separating paper and then exposed to a temperature of 140° C in a die channel 12 m in length through which it is passed at a speed of 1.5 m. A tough elastic frit is formed which can be easily separated from its support and handled without any other support.

c. The frit prepared according to paragraph (b) is again coated with the same powder (applied in a thickness of 60 g/m$^2$) and then exposed at 170° C in the channel as described in Example 1. A homogeneous red sheet with a total thickness of 160 g/m$^2$ is obtained. It has high tensile strength, very good elastic properties and excellent lightfastness.

d. The sheets formed according to paragraphs (b) and (c) can be wet laminated on one or both sides with any supports such as woven cotton or polyester fabrics or non-woven webs, etc. by conventional processes. For wet laminating it is suitable to use, for example, polyurethane solutions, polyurethane dispersions or other adhesives. Laminating may also be carried out by the method of heat sealing with thermoplastic resin powder.

e. A porous sheet prepared according to paragraph (b) is spread coated with a layer of polyurethane powder from paragraph (a) (thickness of application 80 g/m² per application) and exposed to a temperature of 145° C. The sheet is laminated with a nettle cloth (80 g/m²) under pressure while the powder is still in a plastic state. After cooling, the laminate is firmly bonded and can withstand more than 1,000,000 bends in the Bally Flexometer.

EXAMPLE 6

800 g of a copolyester of adipic acid, hexane-1,6-diol and 2,2-dimethyl-propane-1,3-diol in a molar ratio of 65:35 (OH number 65.9) in which 0.8 of the dye described in Example 1 has been finely dispersed are reacted for 1 hour at 60° C and 3 hours at 70 to 80° C with 15.5 g of N,N-bis(β-hydroxypropyl)-methylamine and 786 g of a solution of 260 g of diphenylmethane-4,4-diisocyanate in 650 g of dimethylformamide, which solution had an NCO content of 9.21% after it had been left to stand for 1 hour. After the reaction, the NCO content of the prepolymer is 2037% based on the solids content.

37.7 g of teraphthalic acid-bis-m-aminoanilide are stirred into 600 g of the above NCO prepolymer solution at 50° C and diluted with 20 g of dimethylformamide after 3 hours. The reaction mixture is diluted with dimethyl formamide after every increase in viscosity until, after the addition of a total of 850 g of dimethylformamide, a homogeneous elastomer solution with a viscosity of 640 poises at 20° C is obtained after about 20 hours. The inherent viscosity of the elastomer substrate determined in a 1% solution of hexamethylphosphoramide at 25° C is 1.30. 1% of acetic anhydride is added to the solution which is then spun by the usual dry spinning process. The fibres are prestretched by 0 and by 30% during the winding process and fixed by heat in this state at 130° C. Another part of the solution is spun by the wet spinning process.

Wet spinning process

A 20% elastomer solution is fed at the rate of about 1 ml/min through a spinning die with 20 apertures 0.12 mm in diameter into a coagulating bath about 3 m in length containing 90% by weight of water and 10% by weight of dimethylformamide at 80° to 85° C, and the filaments produced are wound at a draw-off rate of 5 m/min after passing through a washing zone (water/90° C). The spools are kept in water at 50° C for one hour and then dried.

Dry spinning process

An elastomer solution preferably at a concentration of 24 to 26% is spun through a spinning die with 16 apertures 0.20 mm in diameter into a 5 m long shaft heated to 220° to 250° C into which air is injected at about 210° to 280° C The filaments are drawn off at a rate of about 100 m/min and after being dressed with a talcum suspension are wound, e.g. at a rate of 125 – 175 m/min optionally with stretching. The filaments may then be after-treated by heat either on the spools or in a continuous form. Higher spinning velocities may be employed is desired, e.g. 300 to 400 m/min in which case no subsequent stretching process is required.

Red, highly elastic filaments with very good light fastness and wet fastness as well as very good thermal, hydrothermal and mechanical properties are obtained.

EXAMPLE 7 a. 35 g of the dye described in Example 1 and 65 g of an 8.5% solution of a polyester polyurethane which has been obtained by reacting a polyester resin of hexanediol and adipic acid which has an average molecular weight of 800 with tolylene-1,4-diisocyanate were ground up in methyl ethyl glycol/toluene 1 : 1 in a ball mill for 12 hours. The resulting dye paste is suitable for pigmenting any commercially obtainable two-component polyester polyurethane textile coating compounds.

b. 10 g of the red dye paste described in paragraph (a) are slowly stirred into a solution of 30 g of a crosslinkable polyester polyurethane which contains OH end groups and 70 g of ethyl acetate. After a short time (3 to 5 minutes) a stable dispersion is obtained which after the addition of a polyisocyante prepared by reacting 1 mol of trimethylolpropane with 3 mol of tolylene diisocyanate and a heavy metal salt as accelerator is suitable for coating textiles by the reversal or direct coating process. Polyurethane films prepared from this product by known methods are coloured a uniform red which is free from patches and fast to light and solvents.

EXAMPLE 8

0.3% of the dye described in Example 1 based on the polyester content, are dissolved in a 35% solution in equal parts of cresol, xylene and glycolmonoethylether acetate of a phenol masked polyisocyanate which has an NCO content of 12% and a branched polyester with a hydroxyl content of 12% in proportions by weight of 2 : 1. The red lacquer is applied to an aluminium sheet with the aid of a 10 μm lacquer trowel and then stove at 180° C for 30 minutes.

The colour of the lacquer is preserved even after stoving. The dye is built into the hardened binder. When the lacquer is coated with a white stoving lacquer which is stoved for 30 minutes at 130° C, the dye is not seen to steep into the top coat.

EXAMPLE 9

In addition to the die used in the above examples, dyes produced from the diazo and coupling components indicated in the following table can also be used successfully for dyeing polyurethane resins in accordance with Examples 1 to 8 in the colour shades indicated.

| No. | Diazo component | Coupling component | Colour Shade |
|---|---|---|---|
| 1 | 3,4-Dicyanoaniline | N,N-bis-(2-hydroxyethyl)-aniline | orange |
| 2 | 2,5-dichloro-4-cyano aniline | N,N-bis-(2-hydroxyethyl)-aniline | orange |
| 3 | 2-cyano-5-chloroaniline | N,N-bis-(2-hydroxyethyl)-aniline | orange |
| 4 | 3-cyano-4-cyanoaniline | N,N-bis-(2-hydroxyethyl)-aniline | orange |
| 5 | 2,4-dicyanoaniline | N,N-bis-(2-hydroxyethyl)-aniline | scarlet |
| 6 | 2-cyano-4-chloro-6-bis-(hydroxyethyl)-amino-sulphonylaniline | N,N-bis-(2-hydroxyethyl)-aniline | orange |

| No. | Diazo component | Coupling component | Colour Shade |
|---|---|---|---|
| 7 | 2,4-dicyano-6-chloro-aniline | N,N-bis-(2-hydroxyethyl)-aniline | red with blue tinge |
| 8 | 2,5-dichloro-4-cyano-aniline | N,N-bis-(2-hydroxyethyl)-3-methyl-aniline | scarlet |
| 9 | 2-cyano-4-methoxyaniline | N,N-bis-(2-hydroxyethyl)-aniline | orange with yellow tinge |
| 10 | 2,4-dicyano-6-methyl-aniline | N,N-bis-(2-hydroxyethyl)-aniline | red |
| 11 | 2,4,6-tricyanoaniline | N,N-bis-(2-hydroxyethyl)-aniline | red with blue tinge |
| 12 | 2,3,4-trichloro-6-cyano-aniline | N,N-bis-(2-hydroxethyl)-aniline | orange |
| 13 | 2-carboxy-4-cyanoaniline | N,N-bis-(2-hydroxyethyl)-aniline | red with yellow tinge |
| 14 | 2-methoxy-4-cyano-aniline | N,N-bis-(2-hydroxyethyl)-aniline | orange |
| 15 | 2-cyano-4-(2-hydroxyethyl)-aniline | N,N-bis-(2-hydroxyethyl)-aniline | orange with yellow tinge |
| 16 | 2-cyano-4-methylsulphonyl-aniline | N,N-bis-(2-hydroxyethyl)-aniline | orange |
| 17 | 2,5-dicyano-4-dimethyl-amino-sulphonylaniline | N,N-bis-(2-hydroxyethyl)-aniline | orange with red tinge |
| 18 | 3,4-dicyanoaniline | N,N-bis-(2-hydroxyethyl)-aniline | orange with red tinge |
| 19 | 2,4-dicyano-6-bis-(2-hydroxyethyl)-amino-carbonylaniline | N,N-bis-(2-hydroxyethyl)-3-methylaniline | red |
| 20 | 2,6-dicyano-4-methoxyaniline | N,N-bis-(2-hydroxyethyl)-3-methylaniline | red with yellow tinge |
| 21 | 2,4-dicyano-3,5-dimethylaniline | N,N-bis-(2-hydroxyethyl)-3-methylaniline | red with yellow tinge |
| 22 | 2,5-dicyanoaniline | N,N-bis-(2-hydroxyethyl)-3-methylaniline | orange with red tinge |
| 23 | 2,5-dicyano-4,6-dichloroaniline | N,N-bis-(2-hydroxyethyl)-3-methylaniline | red with yellow tinge |
| 24 | 2,6-dicyano-4-chloro-aniline | N,N-bis-(2-hydroxyethyl)-3-methylaniline | orange |
| 25 | 2,5-dicyano-4-bromo-aniline | N,N-bis-(2-hydroxyethyl)-3-methylaniline | orange |
| 26 | 2,4-dichloro-6-cyano-aniline | N,N-bis-(2-hydroxyethyl)-3-methylaniline | orange |
| 27 | 2,3,6-trichloro-4-cyanoaniline | N,N-bis-(2-hydroxyethyl)-3-methylaniline | orange |
| 28 | 3,4-dicyanoaniline | N,N-bis-(2-hydroxyethyl)-3-acetylaminoaniline | red |
| 29 | 2-cyano-4-carbamoyl aniline | N,N-bis-(2-hydroxyethyl)-3-acetylaminoaniline | red |
| 30 | 2,5-dicyano-4-(N-(2-hydroxyethyl)-carbamoyl)-aniline | N,N-bis-(2-hydroxyethyl)-3-acetylaminoaniline | red |
| 31 | 2-cyano-4-phenyl-sulphonyl-aniline | N,N-bis-(2-hydroxyethyl)-3-acetylaminoaniline | red |
| 32 | 3,4-dicyanoaniline | N,N-bis-(2-(2-hydroxyethoxy)-ethyl)-aniline | orange |
| 33 | 2,5-dichloro-4-cyanoaniline | N,N-bis-(2-hydroxyethyl)-2,5-dimethoxyaniline | ruby |
| 34 | 3,4-dicyanoaniline | N-ethyl-N-(2-hydroxyethyl)-aniline | orange |
| 35 | 2,4,6-tricyanoaniline | N,N-bis-(2-hydroxybutyl)-aniline | red with blue tinge |
| 36 | 3,4-dicyanoaniline | N-(2-hydroxyethyl)-2-methylindoline | red |
| 37 | 2-cyano-4-methyl sulphonylaniline | N-(2,3-dihydroxy-propyl)-1,2,3,4-tetrahydroquinoline | orange |
| 38 | 3,4-dicyanoaniline | N-ethyl-N-(2-amino-ethyl)-aniline | orange |
| 39 | 3,4-dicyanoaniline | 1-(N,N-bis-(2-hydroxyethyl)-amino-naphthalene | violet |
| 40 | 2-cyano-4-chloro-6-bis-(2-hydroxyethyl)-amino-carbonylaniline | 5-benzylamino-1-naphtholan | violet |
| 41 | 2-cyano-4-cyano-6-bis-(2-hydroxyethyl)-amino-carbonylaniline | 5-anilino-1-naphthol | violet |
| 42 | 2-cyano-4-chloro-6-bis-(2-hydroxyethyl)-amino-carbonylaniline | 5-(2-hydroxyethyl)-amino-1-naphthol | violet |
| 43 | 2-cyano-4-chloro-6-bis-(2-hydroxyethyl)-amino-carbonylaniline | 3,7-dihydroxy-1,2,3,4-tetrahydro-benzo[n]-quinoline | blue |
| 44 | 2,4-dicyanoaniline | N,N-bis-(2-hydroxyethyl)-aniline | red |
| 45 | 2,4-dicyanoaniline | N,N-bis-(2-hydroxyethyl)-aniline | red |
| 46 | 2,4-dicyanoaniline | N,N-bis-(2-hydroxyethyl)-2-methoxy-5-acetyl-aminoaniline | violet |
| 47 | 2-cyano-4-chloro-6-(bis-(2-hydroxyethyl)-amino-sulphonyl)aniline | N,N-diethyl-3-methyl aniline | orange |
| 48 | 2,4-dicyano-6-bis-(2-hydroxyethyl)-amino-sulphonyl-aniline | N-ethyl-N-benzyl-aniline | red |
| 49 | 2,6-dicyano-4-bis-(4-hydroxybutyl)-amino-sulphonyl-aniline | N-ethyl-N-(β-cyanoethyl-2,5-dimethoxy-aniline | red violet |
| 50 | 2,6-dicyano-4-bis-(4-hydroxybutyl)-amino-sulphonyl-aniline | N-methyl-indoline | scarlet |
| 51 | 2,6-dicyano-4-bis-(4-hydroxybutyl)-amino-sulphonyl-aniline | tetrahydroquinoline | scarlet |
| 52 | 2-cyano-5-chloro-aniline | 3,7-dihydroxy-1,2,3,4-tetrahydrobenzo-[h]-quinoline | blue |
| 53 | 3-chloro-4-cyano-aniline | N-(2-hydroxyethyl)-2-methylindoline | orange |
| 54 | 2,4-dicyanoaniline | N-ethyl-N-(β-amino-ethyl)-aniline | red |
| 55 | 3,4-dicyanoaniline | N,N-diethyl-anthranilic acid | orange |
| 56 | 3,4-dicyano-aniline | N-ethyl-N-(2-carbonyl-hydroxyethyl)-aniline | orange |
| 57 | 3-chloro-4-cyano-aniline | N,N-diethyl-3-hydroxy-acetylaminoaniline | red |
| 58 | 3-chloro-4-cyano-aniline | N-(2-hydroxyethyl)-aniline | orange |
| 59 | 2,4-dicyanoaniline | N,N-bis-(4-hydroxy-butyl-3-methylaniline | red |
| 60 | 2,4-dicyanoaniline | 1-(N,N-bis-(2-hydroxypropyl)-amino naphthalene | red violet |
| 61 | 4-hydroxyethoxy-2,6-dicyanoaniline | N,N-diethyl-3-hydroxy-acetylamino-aniline | ruby |
| 62 | 4-hydroxyethoxy-2,6-dicyano-aniline | N,N-dimethyl-3-hydroxy-methylaniline | red |
| 63 | 4-hydroxyethoxy-2,6-dicyanoaniline | N-butyl-N-(2-cyano-ethyl)-3-methyl-aniline | red |
| 64 | 4-hydroxyethoxy-2,6-dicyanoaniline | N-(2-hydroxyethyl)-N-methyl-3-acetylamino-aniline | ruby |

We claim:
1. Process for dyeing polyurethane resins with dyes which can be built into the resins to form covalent bonds, characterised in that dyes of the formula:

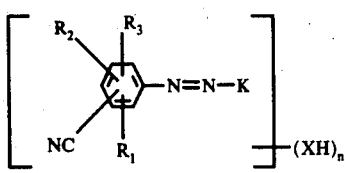

wherein:
R₁ denotes cyano, halogen, alkoxy, alkylsulphonyl, arylsulphonyl, optionally mono or disubstituted carbamoyl or optionally mono- or disubstituted sulphamoyl,
R₂ denotes hydrogen, cyano, carboxyl, halogen, alkoxy, alkyl, alkylsulphonyl or arylsulphonyl,
R₃ denotes hydrogen cyano, halogen or alkyl,
K denotes the residue of a coupling component of the arylamine series,
X denotes O, NH or N—C₁–C₄-alkyl and
n denotes an integer of from 1 to 4,
the XH groups being attached to one or more substituents R₁, R₂, R₃, or to a substituent of the coupling component are added to the reaction mixture or to one of the components before or during the polyaddition reaction.

2. Process according to claim 1, characterised in that dyes of the formula

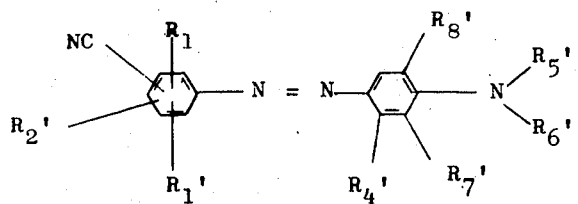

wherein
R₁' denotes cyano chlorine, methoxy, or carboxy,
R₂' denotes hydrogen, cyano, chlorine, sulphonamide or carbonamide optionally mono- or disubstituted by C₁–C₄-alkyl or hydroxy-C₁–C₄-alkyl or it denotes methoxycarbonyl or methyl,
R₃' denotes hydrogen, chlorine or methyl,
R₄' denotes hydrogen, methyl, methoxy, acetylamino or hydroxyacetylamino,
R₅' denotes hydrogen, or an alkyl with 1 to 4 C atoms optionally substituted by hydroxy, C₁–C₄ hydroxyalkoxy cyano amino, methylamino, carboxy or N,N-bis-(2-hydroxyethyl)-aminocarbonyloxy,
R₆' denotes C₁ to C₄-alkyl optionally substituted by hydroxyl or cyano or together with R₇' it denotes propylene, hydroxypropylene, isopropylene or ethylene,
R₇' denotes hydrogen or together with R₆' it denotes propylene, hydroxypropylene, isopropylene or ethylene and
R₈' denotes hydrogen or methoxy are added.

3. Process according to claim 1, characterised in that dyes of the formula

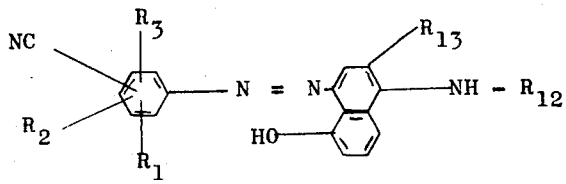

wherein
R₁, R₂ and R₃ have the meaning indicated,
R₁₂ denotes optionally hydroxysubstituted C₁–C₄-alkyl phenyl, benzyl or phenethyl or together with R₁₃ it denotes CH₂—CH₂ or —CH₂—CH₂—CH₂ optionally substituted with hydroxyl, and
R₁₃ denotes hydrogen or together with R₁₂ it denotes optionally hydroxysubstituted ethylene or propylene are added.

4. Process according to claim 1, characterised in that dyes of the formula

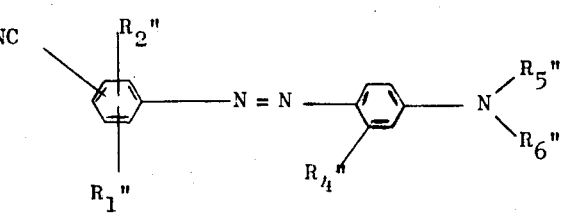

wherein
R₁'' denotes chlorine or cyano,
R₂'' denotes hydrogen or chlorine,
R₄'' denotes hydrogen, methyl or acetylamino and
R₅'' and R₆'' denotes 2-hydroxyethyl are added.

5. Polyurethane resins dyed by the processes according to claim 1.

* * * * *